(12) United States Patent
Kojima et al.

(10) Patent No.: US 9,538,365 B2
(45) Date of Patent: Jan. 3, 2017

(54) METHOD FOR TRANSMITTING AND RECEIVING DATA

(71) Applicant: NATIONAL INSTITUTE OF INFORMATION AND COMMUNICATIONS TECHNOLOGY, Koganei-shi, Tokyo (JP)

(72) Inventors: Fumihide Kojima, Kanagawa (JP); Hiroshi Harada, Kyoto (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 14/443,880

(22) PCT Filed: Oct. 21, 2013

(86) PCT No.: PCT/JP2013/006201
§ 371 (c)(1),
(2) Date: May 19, 2015

(87) PCT Pub. No.: WO2014/080569
PCT Pub. Date: May 30, 2014

(65) Prior Publication Data
US 2015/0319607 A1    Nov. 5, 2015

(30) Foreign Application Priority Data

Nov. 21, 2012   (JP) .................................. 2012-255206

(51) Int. Cl.
*H04W 8/22*      (2009.01)
*H04L 12/44*     (2006.01)
(Continued)

(52) U.S. Cl.
CPC ................ *H04W 8/22* (2013.01); *H04L 12/44* (2013.01); *H04W 52/0216* (2013.01);
(Continued)

(58) Field of Classification Search
CPC ............. H04W 52/343; H04W 56/001; H04W 52/0216; H04W 52/0274; H04W 52/02; H04W 52/0229; H04W 84/18; H04W 8/22; H04W 80/00; H04W 67/12; H04L 67/322; H04L 67/12; H04L 12/44; Y02B 60/50
(Continued)

(56) References Cited

U.S. PATENT DOCUMENTS 5,513,182 A * 4/1996 Kawamura ............. H04L 29/06
                                                            370/254
7,742,784 B2   6/2010 Sugaya
(Continued)

FOREIGN PATENT DOCUMENTS

JP        06232890 A     8/1994
JP     2005101756 A     4/2005
(Continued)

OTHER PUBLICATIONS

Chin-Sean Sum, et al., "Merged MAC proposal summary", IEEE 802.15-12-0513-00-004m, IEEE mentor, Sep. 18, 2012, pp. 1-17.
(Continued)

*Primary Examiner* — Afsar M Qureshi
(74) *Attorney, Agent, or Firm* — Holtz, Holtz & Volek PC (57) ABSTRACT

A method for transmitting and receiving data between a plurality of nodes, each performing a periodical standby operation at a specific interval, includes: a step of detecting another communicable node performed by one node; a step of consecutively transmitting notice information representing data transmission timing to another node for a plurality
(Continued)

of number of times at a predetermined interval by using the one node; a step of performing a standby operation for data according to the data transmission timing represented in the notice information performed by the another node receiving the notice information within the periodical standby operation; a step of transmitting the notice information to the another node according to the data transmission timing performed by the one node; and a step of receiving the transmission data transmitted from the one node according to the notified data transmission timing performed by the another node.

6 Claims, 8 Drawing Sheets

(51) Int. Cl.
    *H04W 56/00*     (2009.01)
    *H04W 52/02*     (2009.01)
    *H04W 76/04*     (2009.01)
    *H04W 84/18*     (2009.01)

(52) U.S. Cl.
    CPC ... *H04W 52/0229* (2013.01); *H04W 52/0274* (2013.01); *H04W 56/001* (2013.01); *H04W 76/048* (2013.01); *H04W 84/18* (2013.01); *Y02B 60/50* (2013.01)

(58) Field of Classification Search
    USPC ............... 370/252–254, 329–331; 455/454; 709/207, 235
    See application file for complete search history.

(56) References Cited

U.S. PATENT DOCUMENTS

| | | | | |
|---|---|---|---|---|
| 7,849,853 | B2 * | 12/2010 | Grychowski | A61M 15/0086 128/200.14 |
| 7,894,853 | B2 * | 2/2011 | Sugaya | H04W 28/06 455/454 |
| 8,064,950 | B2 * | 11/2011 | Sugaya | H04W 28/06 455/454 |
| 8,255,537 | B2 * | 8/2012 | Hamada | G08G 1/161 709/226 |
| 2008/0009289 | A1 | 1/2008 | Kashima et al. | |
| 2009/0116490 | A1 | 5/2009 | Charpentier et al. | |
| 2009/0122733 | A1 | 5/2009 | Ruy et al. | |
| 2010/0049819 | A1 * | 2/2010 | Hamada | G08G 1/161 709/207 |
| 2011/0038313 | A1 | 2/2011 | Park et al. | |
| 2015/0208348 | A1 | 7/2015 | Kojima et al. | |
| 2015/0215866 | A1 | 7/2015 | Kojima et al. | |
| 2015/0319001 | A1 * | 11/2015 | Kojima | H04W 28/065 370/254 |

FOREIGN PATENT DOCUMENTS

| | | |
|---|---|---|
| JP | 2010081470 A | 4/2010 |
| JP | 2012209905 A | 10/2012 |
| JP | 2014103580 A | 6/2014 |
| JP | 2014103581 A | 6/2014 |
| WO | 2008099716 A1 | 8/2008 |

OTHER PUBLICATIONS

International Search Report (ISR) dated Dec. 17, 2013 issued in International Application No. PCT/JP2013/006201.
Jarkko Kneckt, "LB 147 normative text for some PM comments", IEEE 802.11-09/617r1, IEEE mentor, May 14, 2009, pp. 1-21.
Jarkko Kneckt, "LB 165 PM comment resolution text", IEEE 802.11-10/0858r0, IEEE mentor, Jul. 13, 2010, pp. 1-15.
Jarkko Kneckt, et al., "Scanning Considerations", IEEE 802.11-11-1559r0, IEEE mentor, Nov. 9, 2011, p. 13.
Kazuyuki Sakoda, "Some fixes to mesh power management (text)", IEEE P802.11-09/0122r2, IEEE Mentor, Jan. 22, 2009, pp. 1-13.
Kazuyuki Sakoda, "Some fixes to power save", IEEE P802.11-09/0318r1, IEEE Mentor, Mar. 10, 2009, pp. 1-11.
Kazuyuki Sakoda, et al., "Some fixes to power save", IEEE P802.11-09/0318r2, IEEE Mentor, Mar. 10, 2009, pp. 1-13.
Related U.S. Appl. No. 14/443,840, filed May 19, 2015, First Named Inventor: Fumihide Kojima, Title: "Method for Transmitting and Receiving Data".
Santosh Abraham, et al., "Efficient Device and Service Discovery for Peer-to-Peer (P2P) scenarios", IEEE 802.11-11/1517r0, IEEE mentor, Nov. 7, 2011, pp. 1-15.
Seung-Hoon Park, et al., "Defining Peer Discovery and Group", IEEE 802.15-12-0534-00-0008, IEEE mentor, Sep. 20, 2012, p. 13.
Tyan-Shu Jou, et al., "Wi-Mesh Alliance Proposal for 802.11 TGs", IEEE 802.11-05/573r0, IEEE mentor, Jun. 15, 2005, pp. 14, 20-24.
Tyan-Shu Jou, et al., "Wi-Mesh Alliance Proposal for 802.11 TGs", IEEE 802.11-05/573r2, IEEE mentor, Jul. 19, 2005, pp. 14, 20-24.

* cited by examiner

PRIOR ART

METHOD FOR TRANSMITTING AND RECEIVING DATA

CROSS-REFERENCE TO RELATED APPLICATIONS

This application is a filing under 35 U.S.C. 371 of International Application No. PCT/JP2013/006201, filed Oct. 21, 2013, claiming priority of Japanese Patent Application No. JP 2012-255206, filed on Nov. 21, 2012, which applications are incorporated by reference herein in their entirety.

TECHNICAL FIELD

The present invention relates to a method for transmitting and receiving data capable of transmitting/receiving information even in a case where an FFD is not present and effectively suppressing the waste of power.

BACKGROUND ART

A wireless personal area network is a local area network that enables a device under a work environment of a person and devices present on the periphery thereof to be mutually interconnected.

In recent years, in such a wireless personal area network, communication devices, which are compliant with the specification of IEEE 802.15.4, that are small-sized and low-priced and are capable of performing low-output digital radio communication are used.

A network that is compliant with the specification of IEEE 802.15.4 is configured by two types of devices including an FFD (Full Function Device) and an RFD (Reduced Function Device) when the devices are broadly classified.

The FFD is a full-function built-in device having a function for approving the participation of a new device to participate in a personal area network (PAN) to which the FFD belongs and a function for defining a superframe used in communication with the other devices. Among such FFDs, a device that is present solely in each network and further has a function for determining an ID of the whole network is called a PAN coordinator.

On the other hand, the RFD is a device that does not have the participation approval function and the superframe defining function described above, which are included in the FFD, and is a function-limited-type device that has the same functions as those of the FFD except for such functions.

Figure 8:
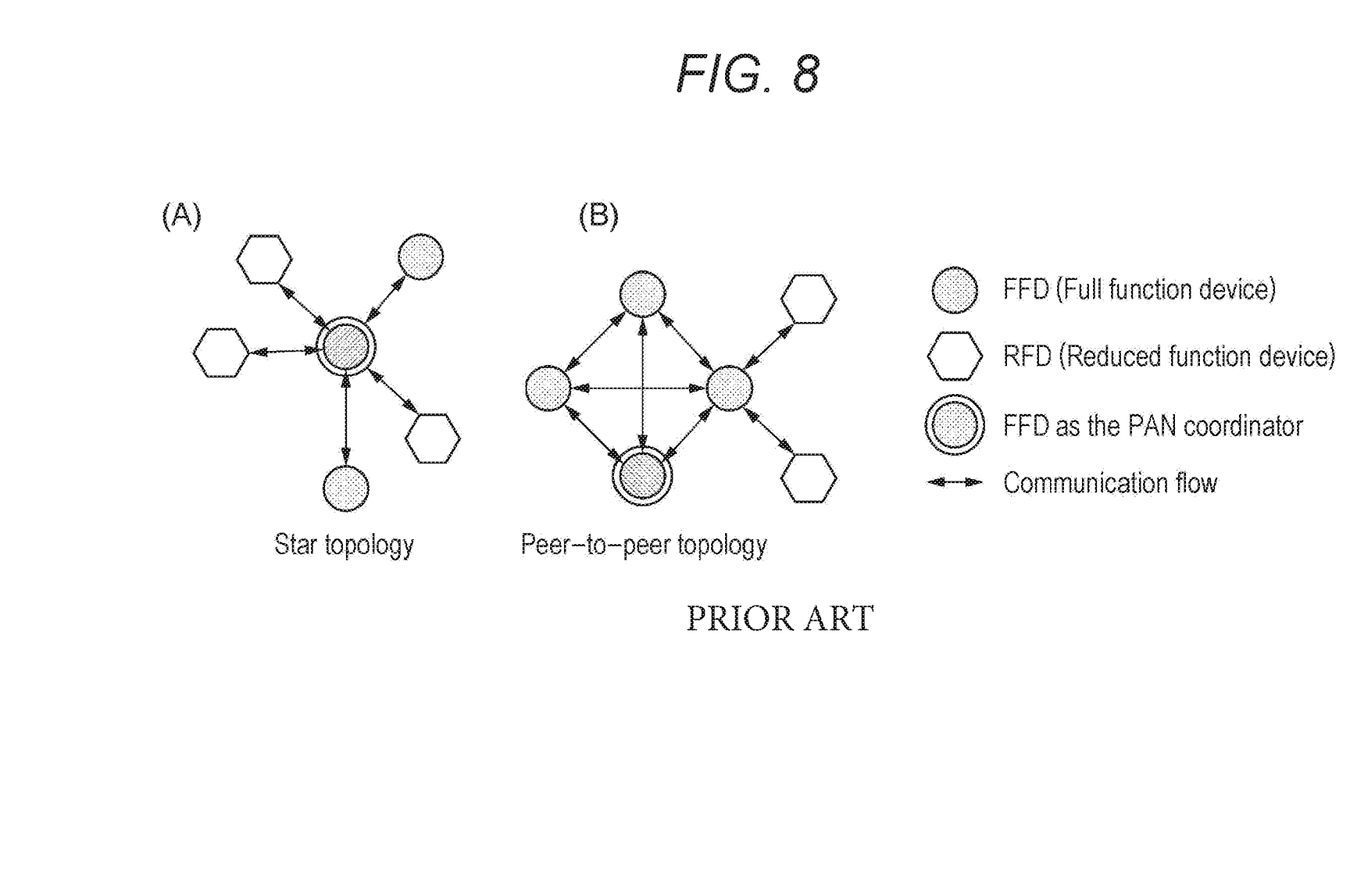
FIGS. 8(A) and 8(B) are schematic diagrams that illustrate conventional topologies of a network configured by FFDs and RFDs.

FIG. 8 is a schematic diagram that illustrates topologies of conventional networks configured by FFDs and RFDs. As illustrated in FIG. 8, as topologies of such a network, there are topologies of a star-type network (FIG. 8(A)), a peer-to-peer network (FIG. 8(B)), and the like.

The star-type network is configured by a PAN coordinator and a plurality of FFDs or RFDs. Among all the devices, master-slave relations are formed (see Patent Literature 1). By periodically transmitting a synchronization signal (beacon) from an FFD that is a master positioned at a higher level to the FFDs or RFDs that are slaves positioned at a lower level, synchronization between the master and each slave is established, and information is transmitted and received using a TDMA (Time Division Multiple Access) system.

On the other hand, the peer-to-peer network is similar to the star-type network described above in that the network is configured by a PAN coordinator and a plurality of FFDs or RFDs but has a difference from the star-type network in that all the devices are equal, in other words, the master-slave relation is not formed between devices. Between the devices configuring the peer-to-peer network, information is transmitted and received using a CSMA (Carrier Sense Multiple Access) system.

CITATION LIST

Patent Literature

Patent Literature 1: JP 06-232890 A

SUMMARY OF INVENTION

Technical Problem

However, in any one of the network topologies described above, the FFD performs time synchronization for communication in the communication network, a participation approval and a withdrawal approval for the communication network and, additionally, centrally manages the setting of sleep time for power saving. Accordingly, in a communication network, the presence of at least one FFD is essential, and this becomes a factor blocking the formation of the flexible communication network.

In addition, in a case where the FFD is not present, it is difficult to synchronize devices in advance, and, in order to enable transmission/reception of information under the situation, conventionally, it is necessary for each of the devices to constantly be in a standby state, and this causes the waste of power.

On the other hand, in the case of being in a standby state at a predetermined interval, in other words, in the case of performing so-called intermittent standby for preventing the waste of power of each device, since there are variations in the interval of the intermittent standby or the standby time among the devices, there are cases where transmission/reception of information cannot be performed.

The present invention is devised in consideration of the problems described above, and an object thereof is to provide a method for transmitting and receiving data capable of performing transmission/reception of information even in a case where an FFD is not present and effectively suppressing the waste of power.

The inventors of the present invention, in order to solve the problems described above, have invented a method for transmitting and receiving data capable of effectively suppressing the waste of power.

Solution to Problem

A method for transmitting and receiving data according to claim 1 of the present application is a method for transmitting and receiving data between nodes, a plurality of the nodes each performing a periodical standby operation at a specific interval, the method for transmitting and receiving data including: a detecting step of detecting another communicable node that is performed by one node; a consecutive transmitting step of consecutively transmitting notice information representing data transmission timing to the another node for a plurality of number of times at a predetermined interval by using the one node; a notice standby step of performing a standby operation for data according to the data transmission timing represented in the notice information that is performed by the another node receiving the notice information within the periodical standby operation; a notice transmitting step of transmitting the notice information to the another node according to the data transmission timing that is performed by the one node; and a notice receiving step of receiving the transmission data transmitted from the one node according to the notified data transmission timing that is performed by the another node.

In addition, a method for transmitting and receiving data according to claim 2 of the present application is a method for transmitting and receiving data between nodes, a plurality of the nodes each performing a periodical standby operation at a specific interval, the method for transmitting and receiving data including: a detecting step of detecting another communicable node that is performed by one node; a standby information transmitting step of transmitting standby information representing timing at which the periodical standby operation is performed to be continuous from the periodical standby operation before the periodical standby operation to the one node that is performed by the another node; a standby step of performing a standby operation simultaneously with generation of data to be transmitted to the another node that is performed by the one node; a standby information receiving step of receiving the standby information transmitted from the another node that is performed by the one node; a data transmitting step of transmitting the data according to the timing represented in the received standby information that is performed by the one node; and a data receiving step of receiving the data transmitted from the one node within the periodical standby operation that is performed by the another node.

In addition, a method for transmitting and receiving data according to claim 3 of the present application is a method for transmitting and receiving data between nodes, a plurality of the nodes each performing a periodical standby operation at a specific interval, the method for transmitting and receiving data including: a detecting step of detecting another communicable node that is performed by one node; a consecutive transmitting step of consecutively transmitting a standby information request for requesting standby information that represents timing at which the another node performs the periodical standby operation to the another node for a plurality of number of times at a predetermined interval that is performed by the one node; a reception standby step of performing a standby operation for the standby information transmitted from the another node continuously from the transmission of the standby information request of each of the plurality of number of times that is performed by the one node; a standby information transmitting step of transmitting the standby information to the one node that is performed by the another node receiving the standby information request from the one node; a standby information receiving step of receiving the standby information transmitted from the another node that is performed by the one node; a data transmitting step of transmitting the data to the another node according to the timing represented in the received standby information that is performed by the one node; and a data receiving step of receiving the data transmitted from the one node within the periodical standby operation that is performed by the another node.

In addition, a method for transmitting and receiving data according to claim 4 of the present application is the method for transmitting and receiving data according to any one of claims 1 to 3, wherein the detecting step of another communicable node includes: a discovery step of repeating a discovery operation including transmission of node information that is information specific to the one node and a reception standby operation for data at predetermined interval that is performed by the one node; and a responding step of transmitting second node information that is information specific to the another node to the one node within the reception standby operation of the one node that is performed by the another node receiving the node information within the periodical standby operation.

In addition, a method for transmitting and receiving data according to claim 5 of the present application is the method for transmitting and receiving data according to any one of claims 1 to 4, wherein, in a case where the reception of the data is not completed within the periodical standby operation, the reception of the data is extended to be performed even after the end of the periodical standby operation.

Advantageous Effects of Invention

In the invention according to claim 1 of the present application, even in a situation in which an FFD is not present and synchronization between the nodes is not set up, information can be transmitted and received. In addition, each node intermittently performs the standby operation instead of performing a constant standby operation and, also at the time of transmitting/receiving data, may be operated only in a period of time represented in the data transmission timing and perform data standby, transmission and reception operations, and accordingly, the waste of power can be effectively suppressed.

In the invention according to claim 2 of the present application, even in a situation in which an FFD is not present and synchronization between the nodes is not set up, information can be transmitted and received. In addition, each node intermittently performs the standby operation instead of performing a constant standby operation and, also at the time of transmitting/receiving data, is operated only in a period of time represented in the data reception timing and performs data standby, transmission and reception operations. Accordingly, the waste of power can be effectively suppressed.

In the invention according to claim 3 of the present application, even in a situation in which an FFD is not present and synchronization between the nodes is not set up, information can be transmitted and received. In addition, each node intermittently performs the standby operation instead of performing a constant standby operation and, also at the time of transmitting/receiving data, is operated only in a period of time represented in the data reception timing and performs data standby, transmission and reception operations. Accordingly, the waste of power can be effectively suppressed.

In the invention according to claim 4 of the present application, neighboring nodes can be detected without setting up synchronization among a plurality of nodes.

In the invention according to claim 5 of the present application, even after the end of the standby time, the transmission/reception of the data can be continued until the completion thereof. Accordingly, the standby time can be shortened, and a time during which each node is in a sleep mode can be lengthened, whereby the consumption of power at each node can be effectively suppressed.

DESCRIPTION OF EMBODIMENTS

Hereinafter, a method for transmitting and receiving data according to each embodiment of the present invention will be described in detail.

First Embodiment

First, a method for transmitting and receiving data according to a first embodiment of the present invention will be described.

Figure 1:
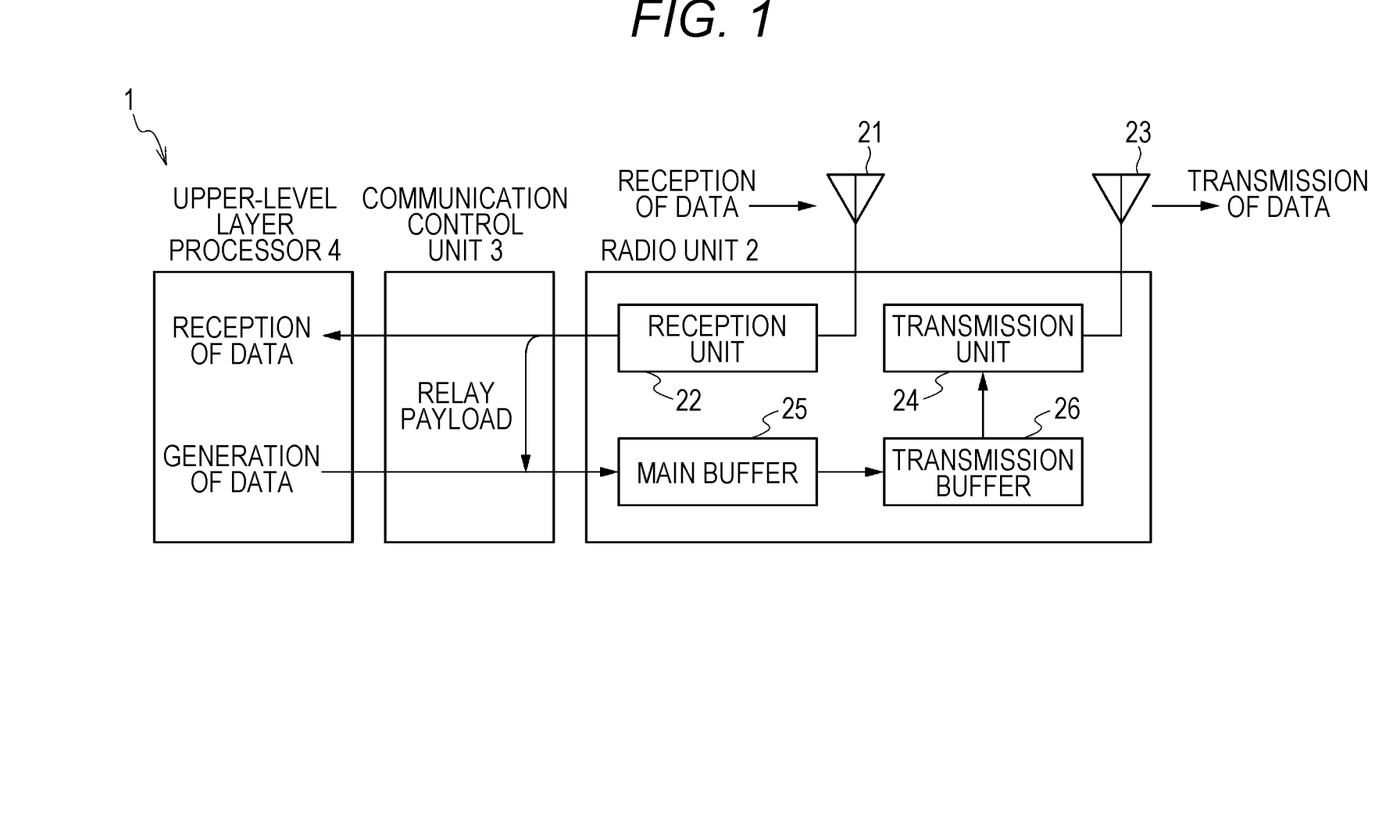
FIG. 1 is a diagram that illustrates the structure of a node in a method for transmitting and receiving data according to an embodiment.

FIG. 1 is a diagram that illustrates the structure of a node in a method for transmitting and receiving data according to the embodiment. The node 1 is configured to include a radio unit 2, a communication control unit 3, and an upper-level layer processor 4. Here, the node is a general term of devices, which include an FFD and an RFD, executing transmission/reception of data such as transmission, relay, and the like of data.

The radio unit 2 includes: a reception unit 22 that receives data through a reception antenna 21; a transmission unit 24 that transmits data through a transmission antenna 23; a main buffer 25 that buffers various kinds of data; and a transmission buffer 26 that is disposed between the main buffer 25 and the transmission unit 24 and buffers transmission data transmitted from the main buffer 25 to the transmission unit 24.

The communication control unit 3 is disposed between the radio unit 2 and the upper-level layer processor 4 and controls the overall radio communication process performed by the radio unit 2. The communication control unit 3 extracts payloads included in data received by the reception unit 22 through the reception antenna 21, determines a process to be executed for each payload, and transmits each payload to the main buffer 25 or the upper-level layer processor 4 according to a result of the determination.

The upper-level layer processor 4 performs various processes for received data and generates various kinds of data relating to the transmission/reception of data such as a new payload and the like.

Figure 2:
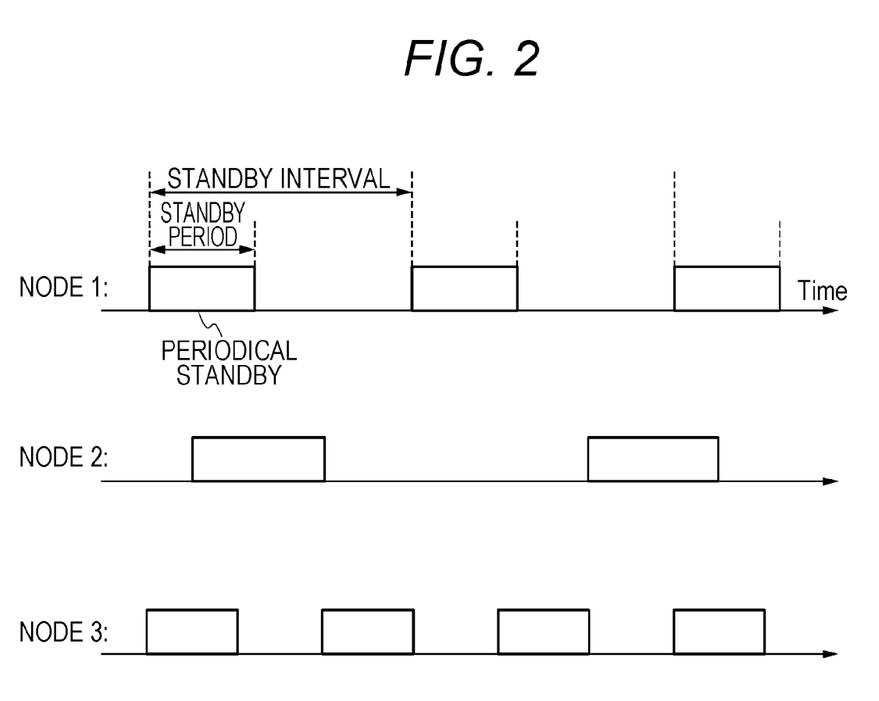
FIG. 2 is a diagram that illustrates the appearance of each node periodically performing a standby operation in a method for transmitting and receiving data according to each embodiment of the present invention.

Next, the appearance of a standby operation performed by the node 1 described above will be described. FIG. 2 is a diagram that illustrates the appearance of each node 1 periodically performing a standby operation in a method for transmitting and receiving data according to each embodiment of the present invention. The periodical standby operation of each node illustrated in FIG. 2 is performed even in the other embodiments to be described later.

As illustrated in FIG. 2, each node performs the periodical standby operation with a specific standby period at a specific interval. In this way, each node is not constantly in a standby state, in other words, not being in a state in which power is constantly input but being intermittently in a standby state, whereby the waste of power can be prevented.

In addition, as illustrated in FIG. 2, while synchronization is not set up between nodes, according to the method for transmitting and receiving data according to the present invention, data can be transmitted and received between nodes even in such a situation.

Figure 3:
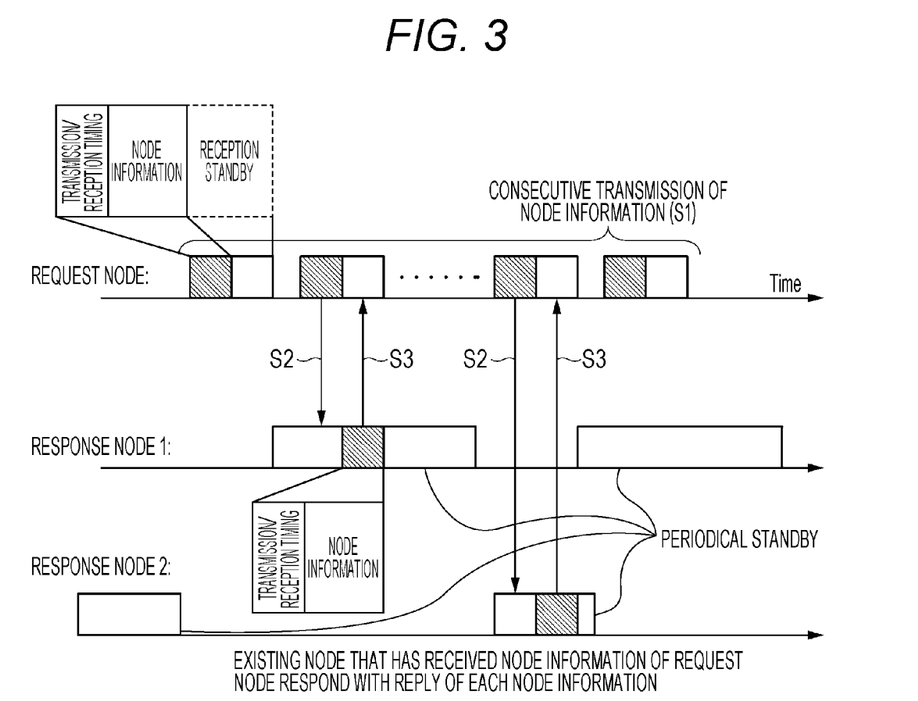
FIG. 3 is a diagram that illustrates the appearance of detection of neighboring nodes in the method for transmitting and receiving data.

Next, a method of detecting neighboring nodes that is performed by such a node will be described. FIG. 3 is a diagram that illustrates the appearance of detection of neighboring nodes in the method for transmitting and receiving data according to this embodiment.

First, in order to transmit data to neighboring nodes, a node (hereinafter, referred to as a "request node") performing detection of communicable nodes present neighboring thereto repeats transmission of information (hereinafter, referred to as "node information") specific to the request node such as an employed data modulation system and timing at which a data standby operation is performed and a data reception standby operation at a predetermined interval (step S1). Hereinafter, the transmission of the node information and the data reception standby operation will be collectively referred to as a discovery operation.

Next, other nodes, which are located near the request node, performing a periodical standby operation at an interval specific thereto receive node information transmitted from the request node within the periodical standby operation (step S2). In the case illustrated in FIG. 2, two nodes (hereinafter, referred to as "response nodes 1 and 2") are present near the request node, and these two response nodes 1 and 2 receive the node information from the request node.

Here, although synchronization has not been set up between the response nodes and the request node 1 and 2, in the discovery operation that is performed regularly by the request node, the node information is repeatedly transmitted, and the response nodes 1 and 2 regularly repeat standby operations, whereby there are cases where the transmission timing of the node information from the request node and the standby timing of the response nodes 1 and 2 match each other. As the matching of both the timings occurs in this way, information can be transmitted and received between nodes for which synchronization has not been set up.

Next, the response nodes 1 and 2 that have received the node information transmitted from the request node transmit node information thereof to the request node, and the request node receives the node information transmitted from the response nodes 1 and 2 within a reception standby operation included in the discovery operation described above (step S3).

By exchanging the node information between the request node and the response nodes 1 and 2 in this way, detection of the response nodes 1 and 2 that is performed by the request node is completed. Thereafter, in a case where information is transmitted and received between the request node and the response nodes 1 and 2, a modulation method of data and the like that are appropriate between the nodes are selected based on the node information.

Figure 4:
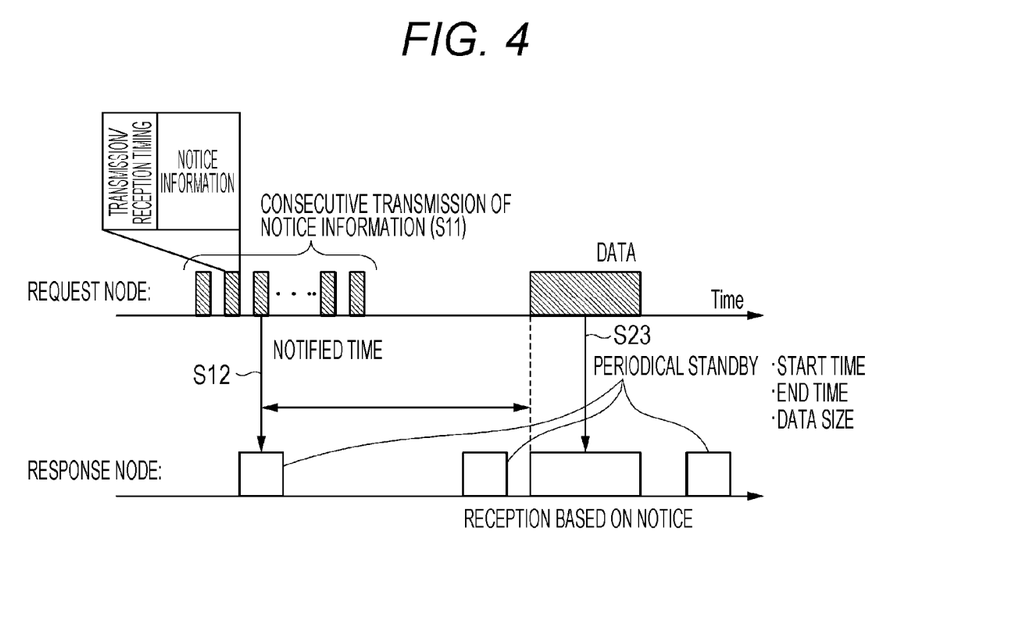
FIG. 4 is a diagram that illustrates the appearance of data transmission/reception between nodes in a method for transmitting and receiving data according to a first embodiment of the present invention.

Next, transmission/reception of actual data between the request node and the response nodes after the detection of the nodes will be described. FIG. 4 is a diagram that illustrates the appearance of data transmission/reception between nodes in a method for transmitting and receiving data according to a first embodiment of the present invention.

First, the request node consecutively transmits notice information representing data transmission timing that represents timing at which data is transmitted (for example, "after how many seconds from the current time point data is transmitted") and the like to the response node at a predetermined interval for a plurality of number of times (step S11). At this time, it is preferable that the consecutive transmission of the notice information is performed for a sufficient number of times to extend over about one period of the periodical standby operation of the response node. The reason for this is that, in a case where the consecutive transmission of the notice information is performed a number of times to extend over about one period for increasing the probability of the reception of the notice information in the response node as described above, the response node can reliably receive the notice information.

Here, the data transmission timing included in the notice information is sequentially shortened from the notice information that is transmitted first. For example, by using the transmission start time point of the notice information transmitted first as the reference, in a case where the data transmission timing included in the first notice information is "after 10 seconds from the current time point", the transmission of the notice information ends after 0.5 seconds, and transmission of the next notice information is started after 1 second after spacing an interval of 0.5 seconds, the data transmission timing included in the next notice information is "9 seconds from the current time point".

Next, the response node performing the periodical standby operation at a specific interval as described above receives the notice information that is transmitted from the request node (step S12). As described above, by performing the consecutive transmission of the notice information for a number of times to extend over about one period of the periodical standby operation of the response node, the response node can reliably receive the notice information, which is desirable.

Next, the response node that has received the notice information, according to the data transmission timing represented in the received notice information, performs a data standby operation, the transmission node transmits data according to the data transmission timing represented in the notice information, and the response node receives the data (step S13). In this way, a series of transmission/reception operations of data is completed.

According to the method for transmitting and receiving data of this embodiment described above, even in a situation in which an FFD is not present and synchronization between the nodes 1 is not set up, information can be transmitted and received.

In addition, each node 1 intermittently performs the standby operation instead of performing a constant standby operation and, also at the time of transmitting/receiving data, may be operated only in a period of time represented in the data transmission timing and perform data standby, transmission and reception operations, and accordingly, the waste of power can be effectively suppressed.

Second Embodiment

Next, a method for transmitting and receiving data according to a second embodiment of the present invention will be described.

Also in the method for transmitting and receiving data according to this embodiment, as illustrated in FIG. 2, each node 1, similar to that of the first embodiment, performs a periodical standby operation with a specific standby period at a specific interval. A method of detecting neighboring nodes 1 according to this embodiment is performed similar to that of the first embodiment described above, and a request node and a response node are formed.

Figure 5:
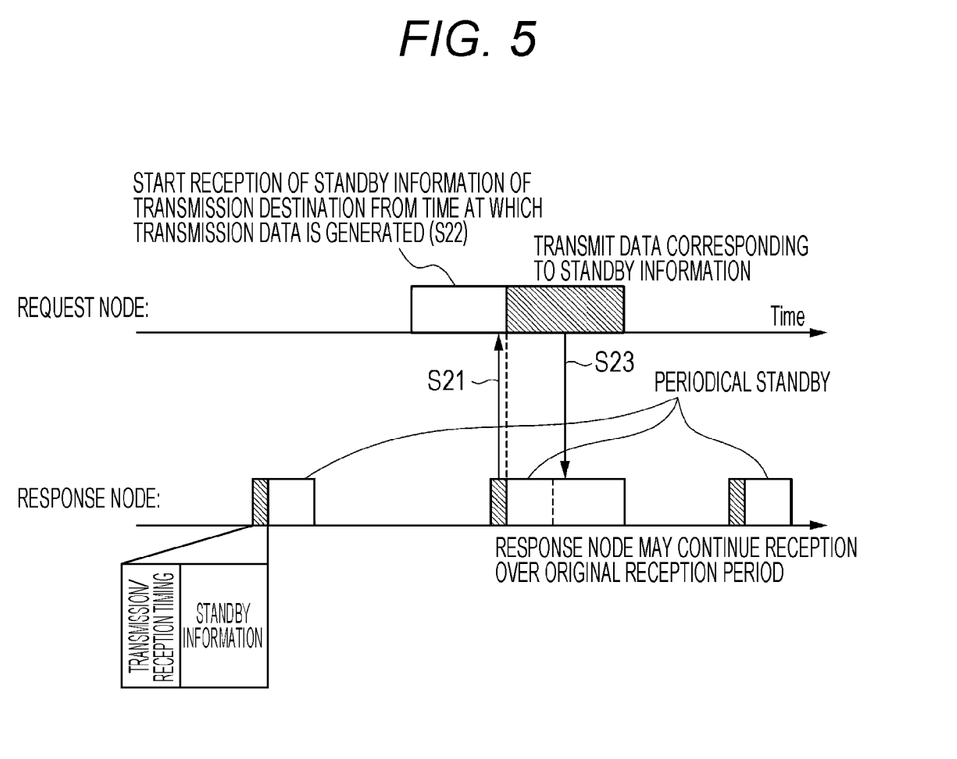
FIG. 5 is a diagram that illustrates the appearance of data transmission/reception between nodes in a method for transmitting and receiving data according to a second embodiment of the present invention.

Next, the appearance of data transmission/reception performed after the detection of neighboring nodes will be described as below. FIG. 5 is a diagram that illustrates the appearance of data transmission/reception between nodes 1 in the method for transmitting and receiving data according to the second embodiment of the present invention.

First, a response node transmits standby information representing timing at which a periodical standby operation is performed to a request node continuously before the periodical standby operation (step S21). By being transmitted continuously before each periodical standby operation, the standby information is repeatedly transmitted with the same period as that of the periodical standby operation.

Meanwhile, the request node generates data to be transmitted to the request node and performs a standby operation (step S22).

Then, when the standby information transmitted from the response node is received by the request node in the middle of the standby operation, the request node transmits the generated data to the response node according to timing, at which the response node performs a periodical standby operation, represented in the received standby information, and the response node receives the data (step S23).

At this time, since the data transmitted from the request node is received within the periodical operation of the response node, the response node receives the data within the periodical standby operation. In this way, a series of transmission/reception operations of data ends.

According to the method for transmitting and receiving data of this embodiment described above, even in a situation in which an FFD is not present and synchronization between the nodes 1 is not set up, information can be transmitted and received.

In addition, each node 1 intermittently performs the standby operation instead of performing a constant standby operation and, also at the time of transmitting/receiving data, is operated only in a period of time represented in data reception timing and performs data standby, transmission and reception operations. For this reason, the waste of power can be effectively suppressed.

Third Embodiment

Next, a method for transmitting and receiving data according to a third embodiment of the present invention will be described.

Also in the method for transmitting and receiving data according to this embodiment, as illustrated in FIG. 2, each node 1, similar to that of the first embodiment, performs a periodical standby operation with a specific standby period at a specific interval. A method of detecting neighboring nodes 1 according to this embodiment is performed similar to that of the first embodiment described above, and a request node and a response node are formed.

Figure 6:
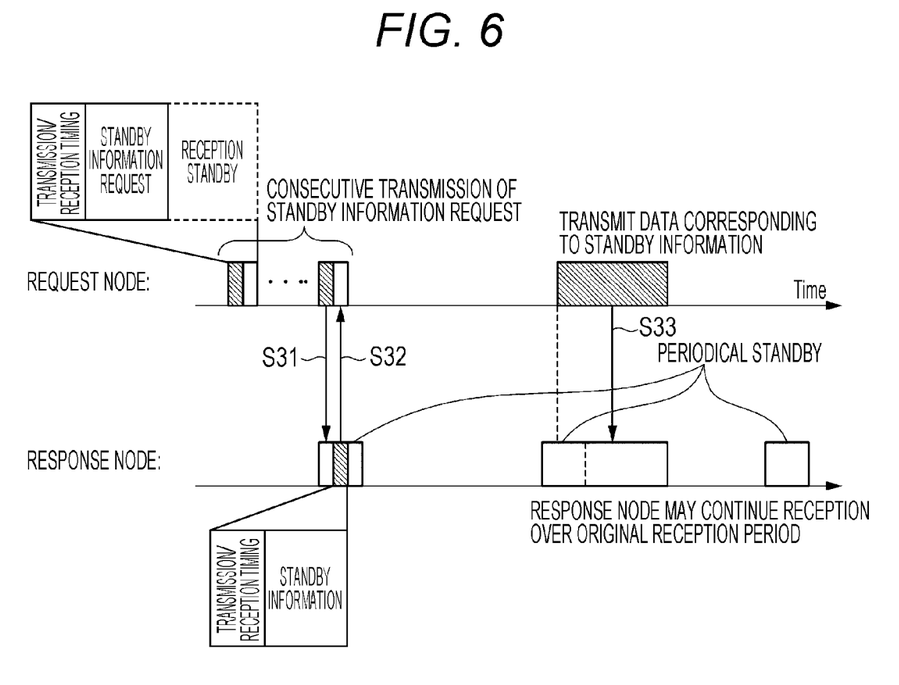
FIG. 6 is a diagram that illustrates the appearance of data transmission/reception between nodes in a method for transmitting and receiving data according to a third embodiment of the present invention.

Next, the appearance of data transmission/reception performed after the detection of neighboring nodes will be described as below. FIG. 6 is a diagram that illustrates the appearance of data transmission/reception between nodes 1 in the method for transmitting and receiving data according to the third embodiment of the present invention.

First, a request node consecutively transmits a standby information request requesting standby information representing timing at which a response node performs a periodical standby operation to the response node a plurality of number of times at a predetermined interval and performs a standby operation for the standby information transmitted from the response node to be described later continuously from each transmission of the standby information request that is performed a plurality of number of times (step S31).

At this time, by performing the consecutive transmission of the standby information request for a plurality of number of times to extend over about one period of the periodical standby operation of the response node, the response node can reliably receive the standby information request, which is desirable.

Next, the response node that has received the standby information request from the request node transmits standby information to the request node in response to this standby information request (step S32). In this way, the request node can acquire the timing of the periodical standby operation of the response node based on the standby information received from the response node.

At the timing of the periodical standby operation of the response node that has been acquired in this way, the request node transmits data to the response node, and the response node receives data transmitted from the request node within the periodical standby operation (step S33).

According to the method for transmitting and receiving data of this embodiment described above, even in a situation in which an FFD is not present and synchronization between the nodes 1 is not set up, information can be transmitted and received.

In addition, each node 1 intermittently performs the standby operation instead of performing a constant standby operation and, also at the time of transmitting/receiving data, is operated only in a period of time represented in data reception timing and performs data standby, transmission and reception operations. For this reason, the waste of power can be effectively suppressed.

Furthermore, in the method for transmitting and receiving data according to each embodiment described above, there are cases where the transmission/reception of data between nodes is not completed within the standby time defined at first. In such cases, the transmission/reception of the data does not need to be completed within the standby time, and, in a case where the transmission/reception of data is not completed within the standby time, even after the end of the standby time, the transmission/reception of data is continuously performed until the completion thereof.

In this way, the standby time can be shortened, and a time during which each node is in a sleep mode can be lengthened, whereby the consumption of power at each node can be effectively suppressed.

However, in the method for transmitting and receiving data according to each embodiment described above, there are cases where the size of the transmission data generated by the upper-level layer processor 4 of each node 1 that transmits data and the data size of data that can be transmitted by the radio unit 2 that is a lower-level layer are different from each other depending on the frequency, the power, and the like at the time of transmitting data (see FIG. 1).

In such cases, by dividing or combining data as is necessary, transmission/reception of the data between nodes 1 can be smoothly performed. Hereinafter, such division/combination of data will be described.

Figure 7:
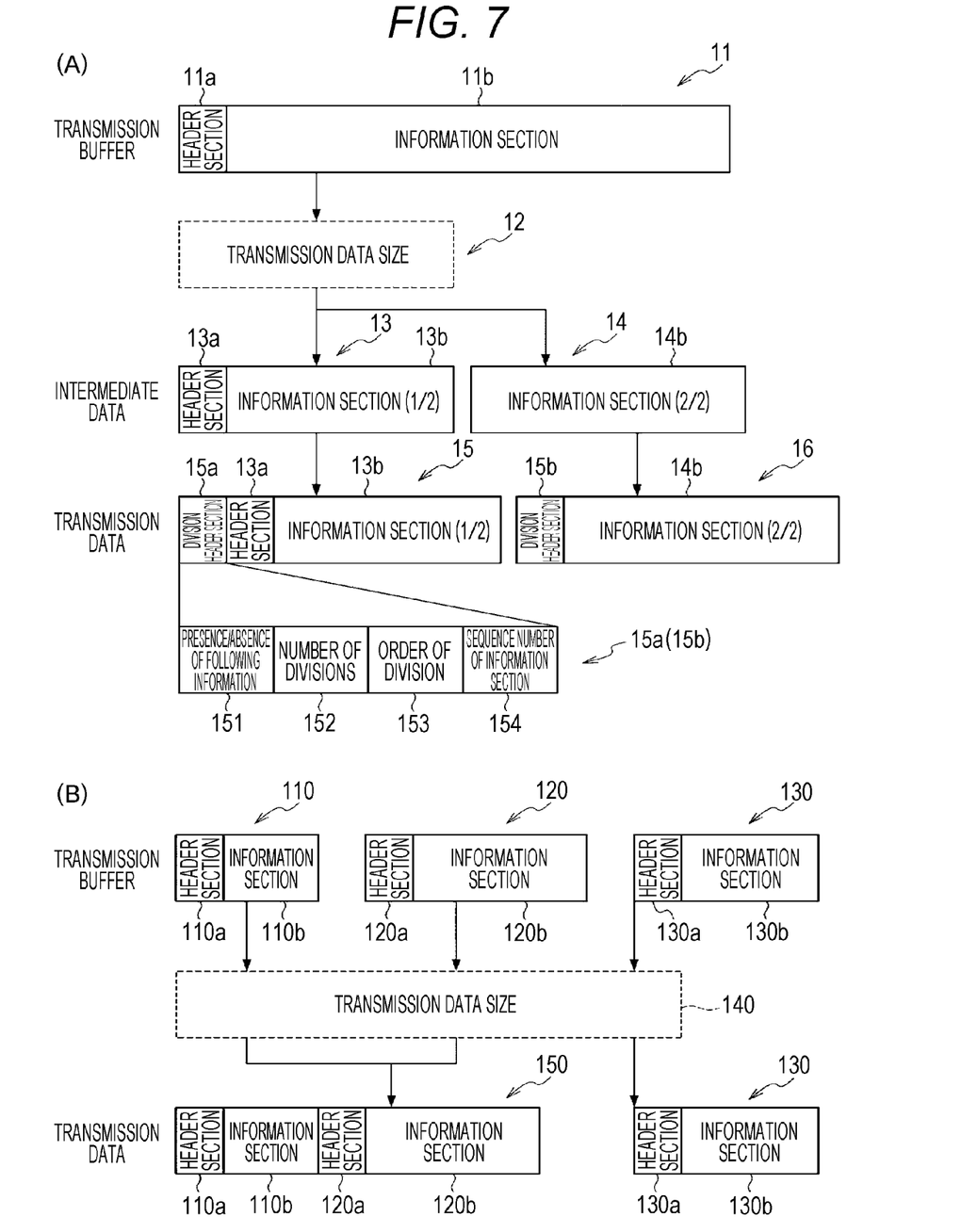
FIG. 7(A) is a diagram that illustrates the appearance of data division in the method for transmitting and receiving data according to each embodiment of the present invention.
FIG. 7(B) illustrates the appearance of data combination therein.

FIG. 7(A) is a diagram that illustrates the appearance of data division in the method for transmitting and receiving data according to each embodiment of the present invention, and FIG. 7(B) is a diagram that illustrates the appearance of data combination therein.

First, a case will be described in which, when a data size that can be transmitted by the transmission unit 24 of the radio unit 2 that is the lower-level layer is small, large data is divided and transmitted. As illustrated in FIG. 7(A), generation data 11 that is stored in the transmission buffer 26 of the radio unit 2 that is transmission target data generated by the upper-level layer processor 4 is configured by a header section 11a that is provided for various processes performed in the upper-level layer processor 4 and an information section 11b that is a data main body to be transmitted to another node. In this example, while the generation data 11 generated by the upper-level layer processor 4 as transmission target data is described as an example, the present invention is not limited thereto. Thus, the transmission target data may be data that is not generated in this node, in other words, relay target data that is received from another node and is transmitted to a further another node.

The communication control unit 3 determines whether or not the generation data 11 has a size equal to or smaller than a data size 12 of data that can be transmitted by the transmission unit 24. Since this generation data 11 has a size larger than the data size 12 of data that can be transmitted by the transmission unit 24, the data is not smoothly transmitted or cannot be transmitted. Then, by repeating this transmission process until the process is successful, an increase in the power consumption is caused.

Thus, the communication control unit 3 of each node divides the generation data 11 into a plurality of pieces of intermediate data. In the example illustrated in FIG. 7(A), the communication control unit 3 divides the generation data 11 into two pieces of intermediate data 13 and 14 having a data size equal to or less than a transmittable data size.

Between the two pieces of data generated through the division into two pieces in the portion of the information section 11b, the intermediate data 13 has a header section 13a, and the other data generated through the division is the intermediate data 14.

Next, the communication control unit 3 respectively adds division header sections 15a and 15b to the intermediate data 13 and 14, thereby generating transmission data 15 and 16 that are division data in an actually-transmitted form.

Each of the division header sections 15a and 15b is configured to include four pieces of data including: data 151 that represents presence/absence of following information of transmission data that is information defining the arrangement order of the intermediate data; data 152 that represents a division number representing the number of pieces of transmission data 15, 16, . . . into which the generation data 11 has been divided; data 153 that represents the division order from the header section 11a; and information 154 that represents a sequence number of the original information section 11b of information sections 13b and 14b.

In this way, the communication control unit 3 of each node divides the generation data 11, thereby generating the transmission data 15 and 16. At this time, the communication control unit 3 sequentially generates intermediate data and transmission data such that the transmission data 15 and 16, which are generated, have a size equal to or less than the data size requested from the transmission unit 24 that manages the transmission of actual information.

Then, the transmission data 15 and 16, which have been generated, are transmitted again from the communication control unit 3 to the transmission unit 24 through the main buffer 25 and the transmission buffer 26 and are transmitted to another node 1. At this time, since each data has a size equal to or less than the data size requested from the transmission unit 24, such data is smoothly transmitted without being delayed.

In addition, the communication control unit 3 of the another node 1 that has received the transmission data 15 and 16 combines such data based on information of the division header sections 15*a* and 16*a* included in the transmission data 15 and 16, thereby restoring the original generation data 11. Hereinafter, the combination of such data will be described more specifically.

In the division header section 15*a* of the transmission data 15, "presence" is defined for the data 151 representing the presence/absence of the following information, "2" is defined for the data 152 representing a division number due to the division of the transmission data into two parts, and "1" is defined for the data 153 representing the division order.

In addition, in the division header section 15*b* of the transmission data 16, "absence" is defined for the data 151 representing the presence/absence of the following information, "2" is defined for the data 152 representing a division number due to the division of the transmission data into two parts, and "2" is defined for the data 153 representing the division order.

Thus, first, since "absence" is represented in the data 151 representing the presence/absence of the following information of the transmission data 16, the communication control unit 3 determines that the transmission data 16 is division data of the last part. In addition, since the data representing the division number of the transmission data 16 is "2", the communication control unit 3 determines that the transmission data is a last part of two-divided data and the transmission data 15, which is the other divided data, is previous divided data. This can also be determined based on that the data 153 representing the division order of the transmission data 16 is "2".

On the other hand, since "presence" is represented in the data 151 representing the presence/absence of the following information of the transmission data 15, the communication control unit 3 determines that the transmission data 15 is not data of the last part. In addition, since the data representing the division number of the transmission data 15 is "2", the communication control unit 3 determines that the transmission data is not a last part of two-divided data and, in this example, determines that the data 15 is data located in a front-most portion. This can also be determined based on that the data 153 representing the division order of the transmission data 15 is "1".

In this way, based on the information of the division header sections 15*a* and 16*a* included in the transmission data 15 and 16, the communication control unit 3 restores the original generation data 11 by combining such data.

In this way, when the transmittable data size in the lower-level layer is small, large data is divided and then is transmitted, and accordingly, regardless of the size of the generation data, the data can be transmitted smoothly and reliably, and there is no repetition of an unnecessary retransmission process, whereby the waste of power can be effectively suppressed.

Next, a case will be described in which, when the transmittable data size of data that can be transmitted by the transmission unit 24 of the radio unit 2, which is a lower-level layer, is sufficiently large, data having a smaller data size is combined and is transmitted.

As illustrated in FIG. 7(B), generation data 110, 120, and 130 that are generated by the upper-level layer processor 4 and are stored in the transmission buffer 26 of the radio unit 2, similar to the case illustrated in FIG. 7(A), are respectively configured by header sections 110*a*, 120*a*, and 130*a* provided for various processes performed by the upper-level layer processor 4 of another node 1 and information sections 110*b*, 120*b*, and 130*b* that are data main bodies to be transmitted to another node 1.

Then, the communication control unit 3, first, determines whether or not each of the generation data 110, 120, and 130 has a size that is equal to or less than the transmittable data size 12 of data that can be transmitted by the transmission unit 24. Here, since each of the generation data 110, 120, and 130 has a size that is much smaller than the data size 140 of data that can be transmitted by the transmission unit 24 of the radio unit 2, it is apparent that the data can be individually transmitted. However, when such data is individually transmitted, it is necessary to perform transmission/reception processes corresponding thereto, and accordingly, the processing efficiency is low, the processing time increases, and the power consumption increases.

Thus, in a case where each of the generation data 110, 120, and 130 is determined to have a size smaller than the transmittable data size 12 of data that can be transmitted by the transmission unit 24, the communication control unit 3 determines whether or not, in a case where some or all of the generation data 110, 120, and 130 are combined, each combined data has a size equal to or less than the data size 12 of data that can be transmitted by the transmission unit 24.

Then, the communication control unit 3 generates intermediate data acquired by combining a plurality of pieces of generation data so as to form a combination having a size equal to or less than the data size 12 of data that can be transmitted by the transmission unit 24. In the example illustrated in FIG. 7(B), the communication control unit 3 determines that the transmission data 150 generated by combining two pieces of intermediate data including the intermediate data 110 and 120 of the generation data 11 has a size equal to or less than the transmittable data size 12 of data that can be transmitted by the transmission unit 24. Thus, based on a result of this determination, the communication control unit 3 actually generates transmission data 150.

The transmission data 150 is generated by combining a start portion of the generation data 120, in other words, the header section 120*a* with a last portion of the information section 110*b* of the generation data 110 to be continuous thereto.

In this example, when data up to the generation data 130 is combined with the transmission data 150, the size of the combined data exceeds the data size 140 of data that can be transmitted. For this reason, the information control unit 3 determines to separately transmit the transmission data without combining the generation data 130 therewith.

The generated transmission data is transmitted to another node. Then, the communication control unit 3 of the another node 1 that has received the transmission data determines that a plurality of pieces of the transmission target data 110 and 120 are included in the transmission data based on the information of the header sections 110a and 120a of the plurality of pieces of the transmission target data 110 and 120 included in the transmission data. Then, the communication control unit 3 restores the plurality of pieces of the transmission target data 110 and 120 by dividing the transmission data 150.

In this way, when the transmittable data size in the lower-level layer is large, by combining a plurality of pieces of small data and transmitting the combined data, the efficiency of the transmission process of data at each node is increased by decreasing the number of times of performing the transmission process, whereby a series of data transmission processes can be performed in a speedy manner, and the power consumption can be suppressed.

REFERENCE SIGNS LIST

1: Node
2: Radio unit
3: Communication control unit
4: Upper-level layer processor
11, 110, 120, 130: Generation data
11a, 13a, 110a, 120a, 130a: Header section
11b, 13b, 14b, 110b, 120b, 130b: Information section
12, 140: Transmission data size
13, 14: Intermediate data
15, 16, 150: Transmission data
15a, 15b: Division header section
21: Reception antenna
22: Reception unit
23: Transmission antenna
24: Transmission unit
25: Main buffer
26: Transmission buffer FIG. 1
UPPER-LEVEL LAYER PROCESSOR
RECEPTION OF DATA
GENERATION OF DATA
3 COMMUNICATION CONTROL UNIT
RELAY PAYLOAD
2 RADIO UNIT
22 RECEPTION UNIT
24 TRANSMISSION UNIT
25 MAIN BUFFER
26 TRANSMISSION BUFFER
TRANSMISSION OF DATA

FIG. 2
NODE 1
STANDBY INTERVAL
STANDBY PERIOD
PERIODICAL STANDBY

FIG. 3
REQUEST NODE
TRANSMISSION/RECEPTION TIMING
NODE INFORMATION
RECEPTION STANDBY
CONSECUTIVE TRANSMISSION OF NODE INFORMATION (S1)
RESPONSE NODE 1
PERIODICAL STANDBY
EXISTING NODE THAT HAS RECEIVED NODE INFORMATION OF REQUEST NODE
RESPOND WITH REPLY OF EACH NODE INFORMATION

FIG. 4
REQUEST NODE
TRANSMISSION/RECEPTION TIMING
NOTICE INFORMATION
CONSECUTIVE TRANSMISSION OF NOTICE INFORMATION (S11)
DATA
RESPONSE NODE
NOTIFIED TIME
PERIODICAL STANDBY
RECEPTION BASED ON NOTICE
START TIME
END TIME
DATA SIZE

FIG. 5
REQUEST NODE
START RECEPTION OF STANDBY INFORMATION OF TRANSMISSION
DESTINATION FROM TIME AT WHICH TRANSMISSION DATA IS GENERATED (S22)
TRANSMIT DATA CORRESPONDING TO STANDBY INFORMATION
RESPONSE NODE
PERIODICAL STANDBY
TRANSMISSION/RECEPTION TIMING
STANDBY INFORMATION
RESPONSE NODE MAY CONTINUE RECEPTION OVER ORIGINAL RECEPTION PERIOD

FIG. 6
REQUEST NODE
TRANSMISSION/RECEPTION TIMING
STANDBY INFORMATION REQUEST
RECEPTION STANDBY
CONSECUTIVE TRANSMISSION OF STANDBY INFORMATION REQUEST
TRANSMIT DATA CORRESPONDING TO STANDBY INFORMATION
RESPONSE NODE
PERIODICAL STANDBY
TRANSMISSION/RECEPTION TIMING
STANDBY INFORMATION
RESPONSE NODE MAY CONTINUE RECEPTION OVER ORIGINAL RECEPTION PERIOD

FIG. 7(A)
TRANSMISSION BUFFER
11a HEADER SECTION
11b INFORMATION SECTION
12 TRANSMISSION DATA SIZE
INTERMEDIATE DATA
13a HEADER SECTION
13b INFORMATION SECTION (1/2)
14b INFORMATION SECTION (2/2)
TRANSMISSION DATA
15a DIVISION HEADER SECTION
13a HEADER SECTION
13b INFORMATION SECTION (1/2)
15b DIVISION HEADER SECTION
14b INFORMATION SECTION (2/2)
151 PRESENCE/ABSENCE OF FOLLOWING INFORMATION
152 NUMBER OF DIVISIONS
153 ORDER OF DIVISION
154 SEQUENCE NUMBER OF INFORMATION SECTION

FIG. 7(B)
TRANSMISSION BUFFER
110a HEADER SECTION

110b INFORMATION SECTION
120a HEADER SECTION
120b INFORMATION SECTION
130a HEADER SECTION
130b INFORMATION SECTION
140 TRANSMISSION DATA SIZE
TRANSMISSION DATA
110a HEADER SECTION
110b INFORMATION SECTION
120a HEADER SECTION
120b INFORMATION SECTION
130a HEADER SECTION
130b INFORMATION SECTION

The invention claimed is:

1. A method for transmitting and receiving data between a plurality of nodes, each of the plurality of the nodes performing a periodical standby operation at a specific interval, the method for transmitting and receiving data comprising:
  detecting, by one of the plurality of nodes, another communicable node from among the plurality of nodes;
  consecutively transmitting, by said one node, notice information representing data transmission timing to said another node for a plurality of number of times at a predetermined interval;
  performing, by said another node, a standby operation for data according to the data transmission timing represented in the notice information received within the periodical standby operation of said another node;
  transmitting, by said one node, transmission data to said another node according to the data transmission timing; and
  receiving, by said another node, the transmission data transmitted from said one node according to the notified data transmission timing,
  wherein the detecting of said another communicable node comprises:
    repeating, by said one node, a discovery operation including transmission of node information that is information specific to the one node and a reception standby operation for data at a predetermined interval; and
    transmitting, by said another node receiving the node information within the periodical standby operation, second node information that is information specific to said another node to the one node within the reception standby operation of the one node.

2. The method for transmitting and receiving data according to claim 1, wherein, in a case where the reception of the data is not completed within the periodical standby operation, the reception of the data is extended to be performed even after the end of the periodical standby operation.

3. A method for transmitting and receiving data between a plurality of nodes, each of the plurality of nodes performing a periodical standby operation at a specific interval, the method for transmitting and receiving data comprising:
  detecting, by one of the plurality of nodes, another communicable node from among the plurality of nodes;
  transmitting, by said another node, standby information representing timing at which the periodical standby operation is performed to be continuous from the periodical standby operation before the periodical standby operation to the one node;
  performing, by said one node, a standby operation simultaneously with generation of data to be transmitted to said another node;
  receiving, by said one node, the standby information transmitted from said another node;
  transmitting, by said one node, the data according to the timing represented in the received standby information; and
  receiving, by said another node, the data transmitted from the one node within the periodical standby operation,
  wherein the detecting of said another communicable node comprises:
    repeating, by said one node, a discovery operation including transmission of node information that is information specific to the one node and a reception standby operation for data at a predetermined interval; and
    transmitting, by said another node receiving the node information within the periodical standby operation, second node information that is information specific to said another node to the one node within the reception standby operation of the one node.

4. The method for transmitting and receiving data according to claim 3, wherein, in a case where the reception of the data is not completed within the periodical standby operation, the reception of the data is extended to be performed even after the end of the periodical standby operation.

5. A method for transmitting and receiving data between a plurality of nodes, each of the plurality of nodes performing a periodical standby operation at a specific interval, the method for transmitting and receiving data comprising:
  detecting, by one of the plurality of nodes, another communicable node from among the plurality of nodes;
  consecutively transmitting, by said one node, a standby information request for requesting standby information that represents timing at which said another node performs the periodical standby operation to said another node for a plurality of number of times at a predetermined interval;
  performing, by said one node, a standby operation for the standby information transmitted from said another node continuously from the transmission of the standby information request for each of the plurality of number of times;
  transmitting, by said another node receiving the standby information request from said one node, the standby information to said one node;
  receiving, by said one node, the standby information transmitted from said another node;
  transmitting, by said one node, data to said another node according to the timing represented in the received standby information; and
  receiving, by said another node, the data transmitted from the one node within the periodical standby operation,
  wherein the detecting of said another communicable node comprises:
    repeating, by said one node, a discovery operation including transmission of node information that is information specific to the one node and a reception standby operation for data at a predetermined interval; and
    transmitting, by said another node receiving the node information within the periodical standby operation, second node information that is information specific to said another node to the one node within the reception standby operation of the one node.

6. The method for transmitting and receiving data according to claim 5, wherein, in a case where the reception of the data is not completed within the periodical standby operation, the reception of the data is extended to be performed even after the end of the periodical standby operation.

* * * * *